(12) United States Patent
Wilensky et al.

(10) Patent No.: US 8,023,768 B2
(45) Date of Patent: *Sep. 20, 2011

(54) UNIVERSAL FRONT END FOR MASKS, SELECTIONS, AND PATHS

(75) Inventors: Gregg D. Wilensky, San Francisco, CA (US); Jen-Chan Chien, Saratoga, CA (US); Sarah A. Kong, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/912,589

(22) Filed: Oct. 26, 2010

(65) Prior Publication Data

US 2011/0038562 A1    Feb. 17, 2011

Related U.S. Application Data

(63) Continuation of application No. 11/610,285, filed on Dec. 13, 2006, now Pat. No. 7,831,108.

(51) Int. Cl.
    G06K 9/20    (2006.01)
    G09G 5/00    (2006.01)
    G06F 17/00   (2006.01)
(52) U.S. Cl. .................. 382/283; 345/626; 715/255
(58) Field of Classification Search .......... 382/128–134, 382/276, 282, 283, 298, 302, 305, 312; 345/522, 345/557, 581, 592, 626, 628, 650, 660; 715/243, 715/255
See application file for complete search history.

(56) References Cited

U.S. PATENT DOCUMENTS

| | | | |
|---|---|---|---|
| 5,469,536 | A | 11/1995 | Blank |
| 5,852,673 | A | 12/1998 | Young |
| 6,323,869 | B1 | 11/2001 | Kohm et al. |
| 6,337,925 | B1 | 1/2002 | Cohen et al. |
| 6,628,295 | B2 | 9/2003 | Wilensky |
| 6,751,343 | B1 | 6/2004 | Ferrell et al. |

(Continued)

FOREIGN PATENT DOCUMENTS

EP    1 179 733    2/2002

OTHER PUBLICATIONS

"ARCH 593 Digital Image Media Handout 1.1," Sep. 9, 2004, XP002497709, Virginia University, URL: http://www.arch.virginia.edu/computing/docs/photoshop/Introduction_to_Photoshop.

(Continued)

*Primary Examiner* — Kanjibhai Patel
(74) *Attorney, Agent, or Firm* — Robert C. Kowert; Meyertons, Hood, Kivlin, Kowert & Goetzel, P.C.

(57) ABSTRACT

A method, system, and computer-readable storage medium are disclosed for editing a digital image with automatic conversion of region modalities. Input comprising an instruction to perform an operation on a first portion of the digital image may be received. The first portion of the digital image may comprise data defined by a first region modality. The operation may be applicable to data defined by a second region modality. In response to receiving the input, the first portion of the digital image may be automatically converted from the first region modality to the second region modality. The operation may be automatically performed on the converted first portion of the digital image (i.e., as defined by the second region modality).

20 Claims, 8 Drawing Sheets

U.S. PATENT DOCUMENTS

| | | |
|---|---|---|
| 6,920,250 B1 | 7/2005 | Kletter et al. |
| 6,940,518 B2 | 9/2005 | Minner et al. |
| 6,961,922 B1 | 11/2005 | Knutson |
| 7,221,464 B2 * | 5/2007 | Yamano ........................ 358/1.13 |
| 7,295,208 B2 | 11/2007 | White et al. |
| 7,424,672 B2 | 9/2008 | Simske et al. |
| 7,738,683 B2 * | 6/2010 | Cahill et al. .................. 382/128 |

OTHER PUBLICATIONS

International Search Report and Written Opinion from PCT/US2007/087432, mailed Oct. 10, 2008.

* cited by examiner

UNIVERSAL FRONT END FOR MASKS, SELECTIONS, AND PATHS

This application is a continuation of U.S. application Ser. No. 11/610,285, which was filed on Dec. 13, 2006.

BACKGROUND

1. Field of the Invention

This application is a continuation of U.S. application Ser. No. 11/610,285, which was filed on Dec. 13, 2006, now issued as U.S. Pat. No. 7,831,108.

2. Description of the Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited bitmap editors suitable for relatively simple operations such as rotating and cropping images; and professional-grade programs such as Adobe Photoshop®, Adobe Illustrator®, and Adobe AfterEffects® (all available from Adobe Systems, Inc.) with large and complex feature sets.

Digital images may include raster graphics, vector graphics, or a combination thereof. Raster graphics data (also referred to herein as bitmaps) may be stored and manipulated as a grid of individual picture elements called pixels. Suitable image editors may be used to modify pixels (e.g., values such as hue, brightness, saturation, transparency, etc.) on a pixel-by-pixel basis or as a group. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. A black and white bitmap may require less space (e.g., one bit per pixel). Raster graphics are often used for photographs and photo-realistic images.

Vector graphics data may be stored and manipulated as one or more geometric objects. The geometric primitives (e.g., points, lines, polygons, Béizier curves, and text characters) may be based upon mathematical equations to represent parts of digital images. Suitable image editors may be used to perform operations on these objects such as rotation, translation, stretching, skewing, changing depth order, and combining with other objects. Vector graphics are often rasterized, or converted to raster graphics data, in the process of displaying the data on a display device or printing the data with a printer. While raster graphics may often lose apparent quality when scaled to a higher resolution, vector graphics may scale to the resolution of the device on which they are ultimately rendered. Therefore, vector graphics are often used for images that are sought to be device-independent, such as in typesetting and graphic design.

Many digital image editing operations may be applied selectively to a portion of the digital image. A digital image editor may provide more than one way to define a portion of a digital image on which an operation is sought to be performed. These ways of defining a portion of a digital image are referred to herein as "region modalities" or "modalities." Suitable region modalities may include paths, masks, and selections.

A path may comprise a vector description of a line, curve, or enclosed object (e.g., a polygon). Vector-based tools such as a pen tool, a freeform pen tool, a type tool, a rectangle tool, a polygon tool, a line tool, and other suitable tools may be used to generate paths. Suitable path-based operations may be applied to paths. For example, a path may be stroked so that another tool (e.g., a paintbrush) may modify the region along the path.

A mask may typically comprise any image having a single color channel (e.g., a grayscale image). Masks may be used for various purposes. For example, an alpha channel may be a raster image mask which is used to form one component of a color image or the single component of a grayscale image. A layer mask may be used to modulate the blending of two layers (e.g., by removing or "masking" a portion of one or more layers from the final image). A soft mask may comprise a raster image mask having some values which lie between the minimum and maximum values. Suitable mask-based operations may be applied to modify the mask. For example, various filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to masks.

A selection may represent a region of interest in the digital image and may include one or more pixels (comprising one or more color channels) and/or geometric objects. A selection may be represented by a raster image mask having a single channel indicating per-pixel or per-object membership (full, none, or partial) in the selection. In most digital image editors, selections may be generated in various ways. For example, a marquee tool may permit the selection of rectangular or elliptical areas in an image. A lasso tool may allow the user to draw a freehand selection area. A magic wand tool may permit the selection of parts of an image based on a color range of pixels. Facilities such as edge detection, masking, alpha compositing, and color and channel-based extraction may also be used to generate selections. The pixels and/or objects in the selection may be contiguous or non-contiguous. Suitable selection-based operations may be applied to modify the selection itself. For example, a border operation may produce a selection that borders the edges of the original selection. Expand and contract operations may respectively make the selection larger or smaller. A smooth operation may smooth out irregularities in the selection. A feather operation may add softness to the edges of the selection.

Therefore, various region modalities such as paths, masks, and selections may comprise various ways of defining a portion of a digital image for localized image processing. However, certain image editing operations may be configured for application only to a path, only to a mask, or only to a selection. Although some image editing programs may provide facilities for manually converting paths, masks, and selections to one another, these facilities may be cumbersome and time-consuming to use.

SUMMARY

Various embodiments of systems, methods, and computer-readable storage media for editing a digital image are disclosed. According to one embodiment, input comprising an instruction to perform an operation on a first portion of the digital image may be received. The first portion of the digital image may comprise data defined by a first region modality. The operation may be applicable to data defined by a second region modality. The region modalities may comprise different ways of defining a region, a set of pixels or vertices, or any other set of target data in a digital image. In various embodiments, the region modalities may comprise types of masks, selections, and/or paths. In response to receiving the input, the first portion of the digital image may be automatically converted from the first region modality to the second region modality. The second region modality may define the first portion of the digital image in a manner differing from the first region modality. The operation may be automatically performed on the converted first portion of the digital image (i.e., as defined by the second region modality).

According to one embodiment, the operation may be applicable to a region defined by any of a plurality of region modalities (e.g., a combination of a mask, selection, and/or a path). Under these circumstances, the user may be presented with a set of choices of a "target" modality for the operation. For example, a preview of the regions respectively defined by each of the plurality of region modalities may be displayed. The method may further comprise receiving input comprising a choice of the target region modality (e.g., the second region modality) for the operation.

According to one embodiment, parameters usable in automatically converting the first portion between region modalities may be defined. For example, the parameters may be defined according to predetermined default values and/or user input. According to one embodiment, the first portion of the digital image may be automatically converted from the second region modality back to the first region modality after the operation has been performed.

Figure 1:
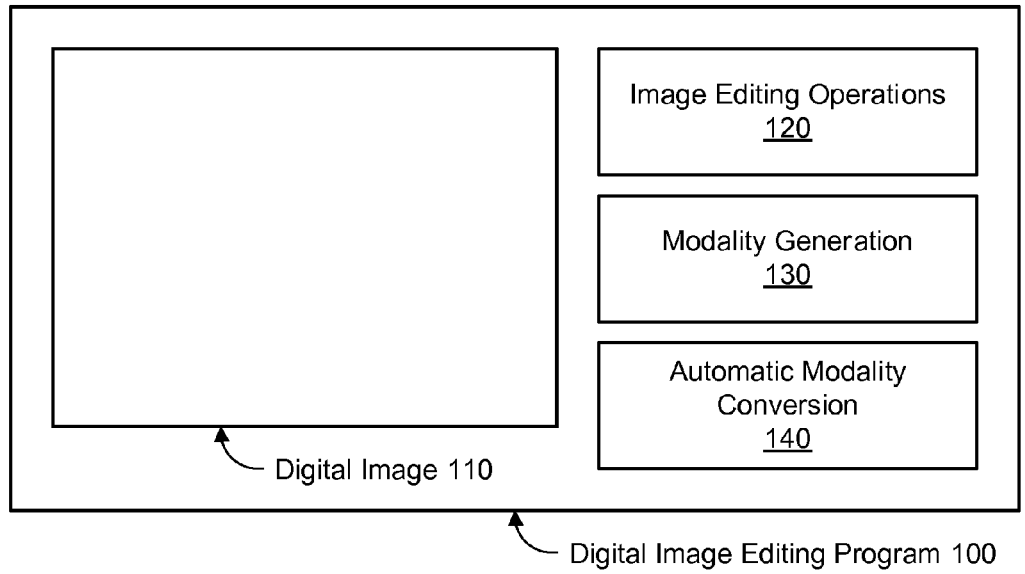
FIG. 1 is a block diagram illustrating one embodiment of a digital image editing program configured for automatic conversion between region modalities.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents, and alternatives falling within the spirit and scope of the present invention as defined by the appended claims.

DETAILED DESCRIPTION OF EMBODIMENTS

Figure 13:
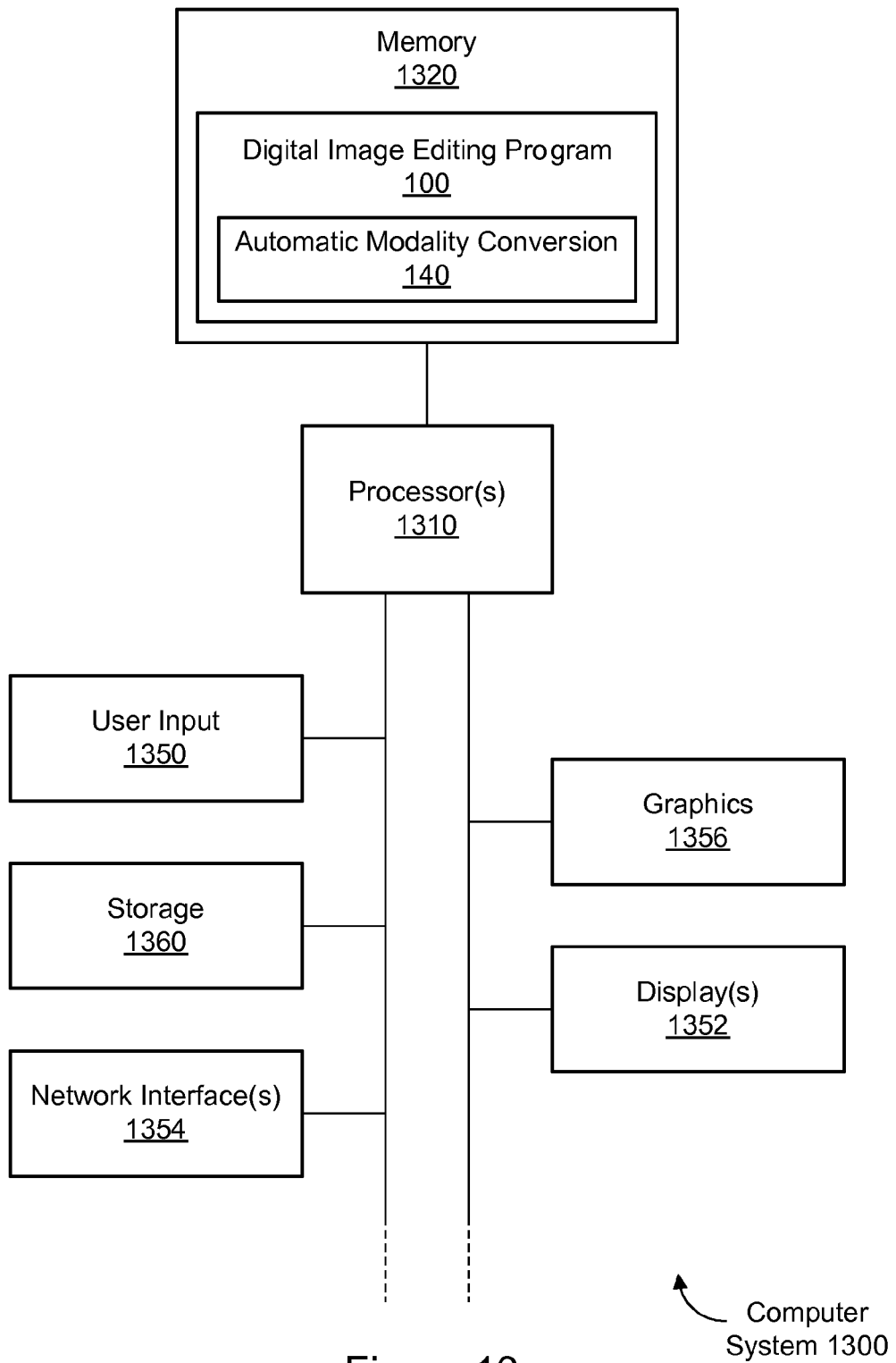
FIG. 13 is a block diagram illustrating constituent elements of a computer system that is configured to implement embodiments of the systems and methods for digital image editing with automatic conversion between region modalities.

Various embodiments may provide a universal front end for performing image editing operations on selections, masks, and paths using automatic conversion from one region modality to another. FIG. 1 is a block diagram illustrating one embodiment of a digital image editing program 100 configured for automatic conversion between region modalities. The region modalities may comprise different ways of defining a region, a set of pixels or vertices, or any other set of target data in a digital image. A digital image editing program 100 may comprise a plurality of image editing operations 120. In one embodiment, a suitable product such as Adobe Photoshop®, Adobe Illustrator®, or Adobe AfterEffects® (all available from Adobe Systems, Inc.) may be used as the image editor 100. The image editing program 100 may be used to create and/or modify a digital image 110. Using region modality generation facilities 130, a portion of the digital image 110 may be defined by generating an appropriate region modality such as a selection, mask, or path. As will be discussed in greater detail below, facilities for automatic region modality conversion 140 may be provided as part of the universal front end for selections, masks, and paths. As shown in FIG. 13, the image editing program 100 and its constituent elements and data may be stored in a memory 1320 of a computer system 1300.

Figure 2:
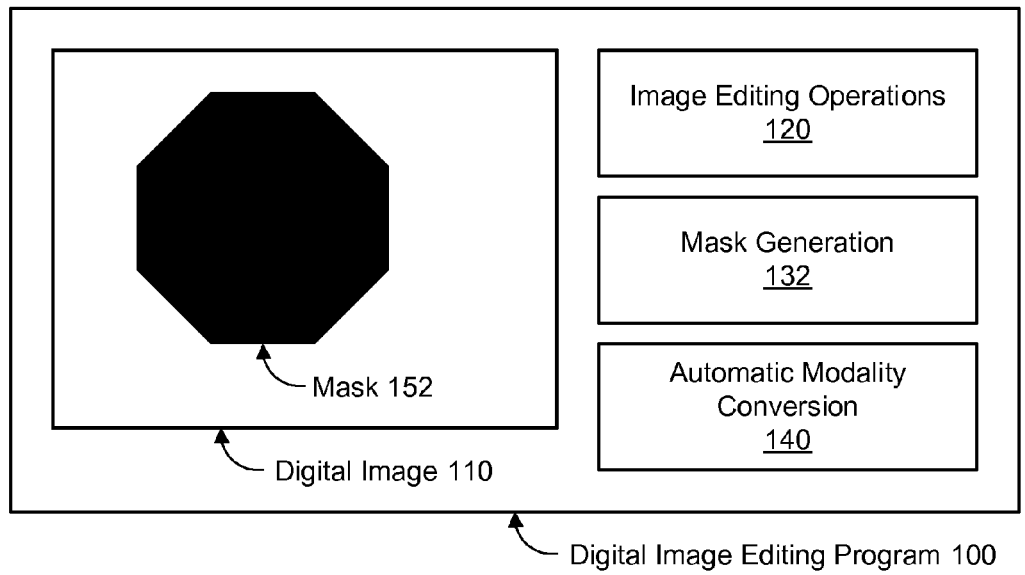
FIG. 2 is a block diagram illustrating one embodiment of a digital image editing program configured for automatic conversion between region modalities including masks.

FIG. 2 is a block diagram illustrating one embodiment of a digital image editing program 100 configured for automatic conversion between region modalities including masks. In one embodiment, the image editing program 100 may comprise tools for mask generation 132. A mask 152 may typically comprise any image having a single color channel (e.g., a grayscale image). Masks may be used for various purposes. For example, an alpha channel may be a raster image mask which is used to form one component of a color image or the single component of a grayscale image. A layer mask may be used to modulate the blending of two layers. In one embodiment, the layer mask may be linked to another layer such that the layer mask "masks" or hides part of the layer from the final image. For example, if the mask 152 is a hard layer mask, it may hide part of an associated layer within the bounds of the black octagon. A soft mask may comprise a raster image mask having some values which lie between the minimum and maximum values (in contrast to a hard mask). The image editing operations 120 may comprise suitable mask-based operations for modifying the mask 152. For example, various filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to masks.

Figure 3:
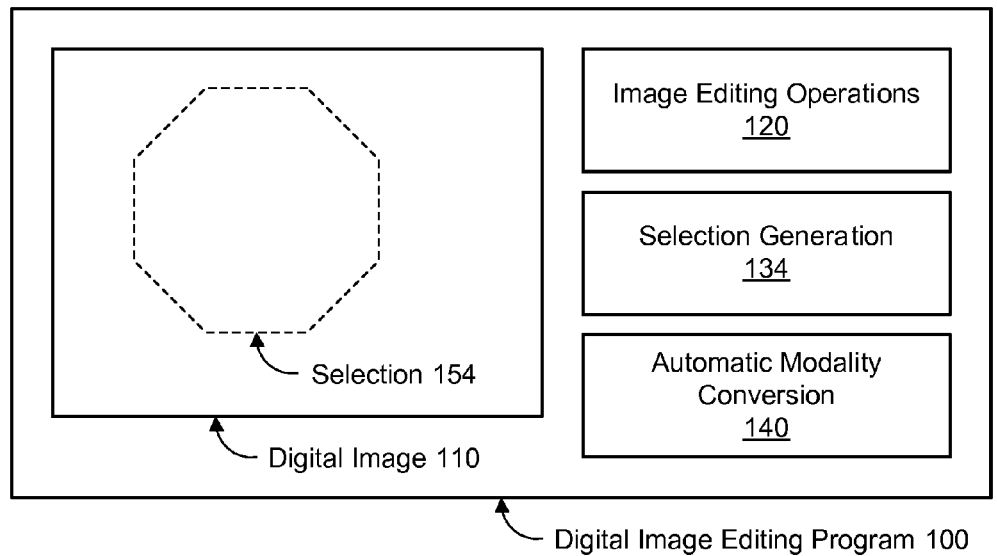
FIG. 3 is a block diagram illustrating one embodiment of a digital image editing program configured for automatic conversion between region modalities including selections.

FIG. 3 is a block diagram illustrating one embodiment of a digital image editing program 100 configured for automatic conversion between region modalities including selections. A selection 154 may represent a region of interest in the digital image and may include one or more pixels (comprising one or more color channels) and/or geometric objects. A selection 154 may be represented by a raster image mask having a single channel indicating per-pixel or per-object membership (full, none, or partial) in the selection. In one embodiment, the image editing program 100 may comprise tools 134 for generating a selection 154. For example, a marquee tool may permit the selection of rectangular or elliptical areas in an image. A lasso tool may allow the user to draw a freehand selection area. A magic wand tool may permit the selection of parts of an image based on a color range of pixels. Facilities such as edge detection, masking, alpha compositing, and color and channel-based extraction may also be used to generate selections. The pixels and/or objects in the selection may be contiguous or non-contiguous. The image editing operations 120 may comprise suitable selection-based operations for modifying the selection itself. For example, a border operation may produce a selection that borders the edges of the original selection. Expand and contract operations may respectively make the selection larger or smaller. A smooth operation may smooth out irregularities in the selection. A feather operation may add softness to the edges of the selection.

Figure 4:
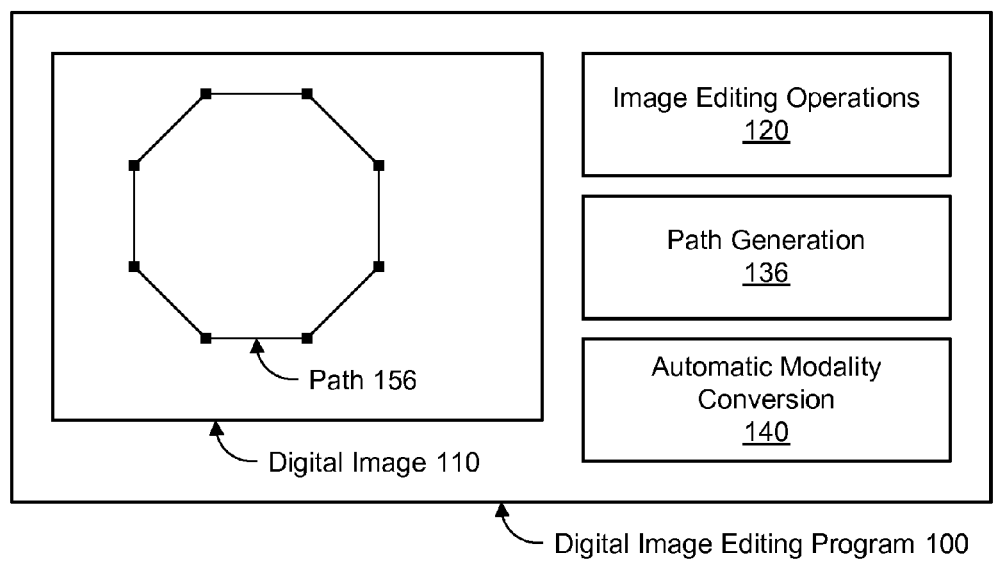
FIG. 4 is a block diagram illustrating one embodiment of a digital image editing program configured for automatic conversion between region modalities including paths.

FIG. 4 is a block diagram illustrating one embodiment of a digital image editing program configured for automatic conversion between region modalities including paths. In one embodiment, the image editing program 100 may comprise tools for path generation 136. A path 156 may comprise a vector description of a line, curve, or enclosed object (e.g., a polygon). Vector-based tools such as a pen tool, a freeform pen tool, a type tool, a rectangle tool, a polygon tool, a line tool, and other suitable tools may be used to generate paths. The image editing operations 120 may comprise suitable path-based operations applicable to the path 156. For example, a path may be stroked so that another tool (e.g., a paintbrush) may modify the region along the path.

Figure 5:
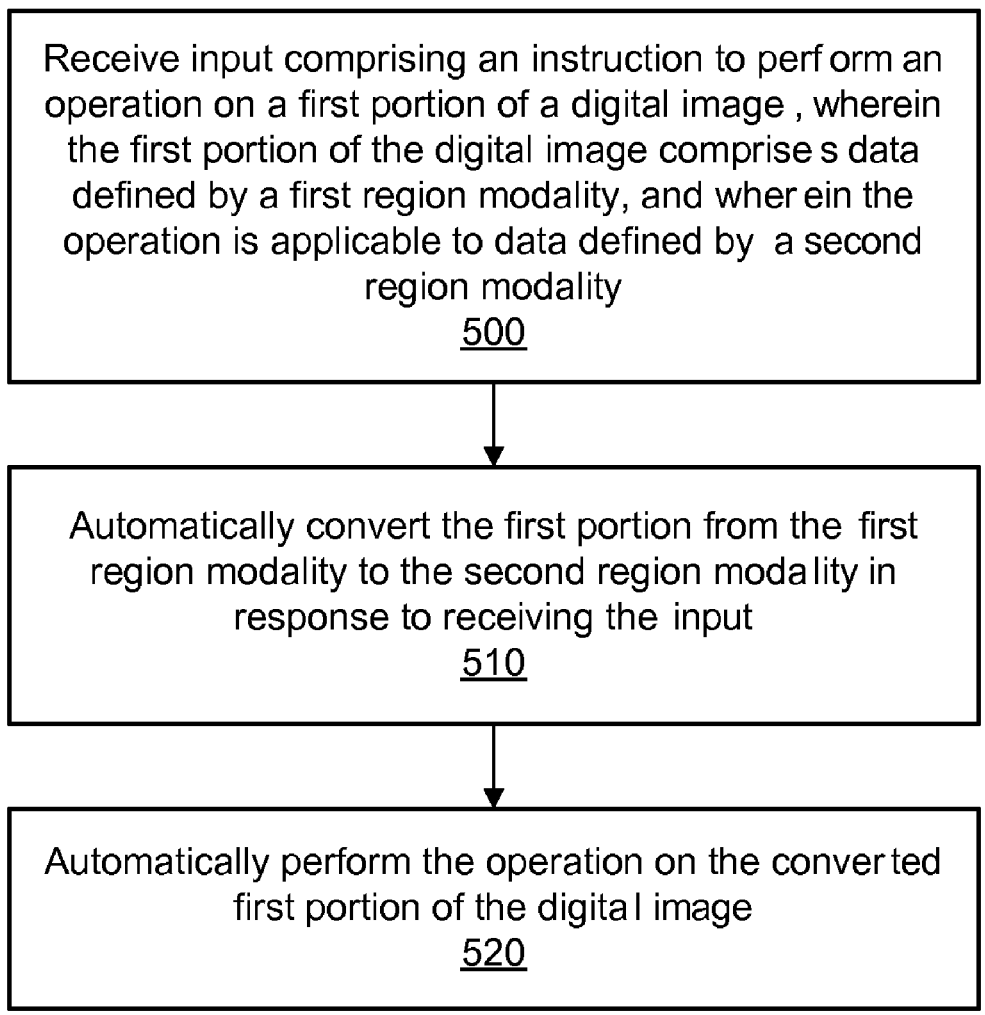
FIG. 5 is a flow diagram illustrating one embodiment of a method for editing a digital image with automatic conversion between region modalities.

FIG. 5 is a flow diagram illustrating one embodiment of a method for editing a digital image with automatic conversion between region modalities. As shown in block 500, input comprising an instruction to perform an operation on a first portion of the digital image may be received. The first portion of the digital image may comprise data defined by a first region modality using the modality generation facilities 130. In various embodiments, the first region modality may comprise a mask 152 generated using mask generation facilities 132, a selection 154 generated using selection generation facilities 134, or a path 156 generated using path generation facilities 136. The operation may be one of the image editing operations 120 provided by the digital image editing program 100. The instruction to perform the operation may be generated by a user of the digital image editing program 100 and may be received as input by the digital image editing program 100.

The operation specified in the input may be configured to operate on data defined by a second region modality which differs from the first region modality in the manner in which it defines a region of interest in the digital image 110. For example, if the first region modality is a mask 152, then the operation may comprise a selection-based operation (e.g., an expansion) or a path-based operation (e.g., a stroke using a designated brush). If the first region modality is a selection 154, then the operation may comprise a mask-based operation (e.g., a Gaussian blur) or a path-based operation (e.g., a stroke using a designated brush). If the first region modality is a path 156, then the operation may comprise a selection-based operation (e.g., an expansion) or a mask-based operation (e.g., a Gaussian blur). The operation may not be directly available to the first region modality.

As shown in block 510, the first portion of the digital image may be automatically converted from the first region modality to the second region modality in response to receiving the input. In one embodiment, the automatic modality conversion 140 may automate existing conversion facilities in the digital image editing program 100. According to one embodiment, parameters usable in automatically converting the first portion between region modalities may be defined. For example, when converting a selection to a mask, a bit-depth conversion may be performed automatically according to the parameters. As a further example, when converting a selection to a path, an appropriate tolerance may be specified for controlling the tightness of the fit of a Bezier curve which models the edge of the selection. The configuration parameters may be defined according to predetermined default values and/or user input. The operation(s) described in block 510 may be performed automatically (i.e., without user intervention subsequent to the instruction input and/or configuration parameters) and programmatically (i.e., by a computer according to a computer program).

As shown in block 520, the operation may be automatically performed on the converted first portion of the digital image (i.e., as defined by the second region modality). The operation(s) described in block 520 may be performed automatically (i.e., without user intervention subsequent to the instruction input) and programmatically (i.e., by a computer according to a computer program).

According to one embodiment, the first portion of the digital image may be automatically converted from the second region modality back to the first region modality after the operation has been performed. In one embodiment, the automatic modality conversion facilities 140 may again be used for the re-conversion. Again, the re-conversion may be performed according to configuration parameters specified by the user and/or predetermined default values.

Figure 6:
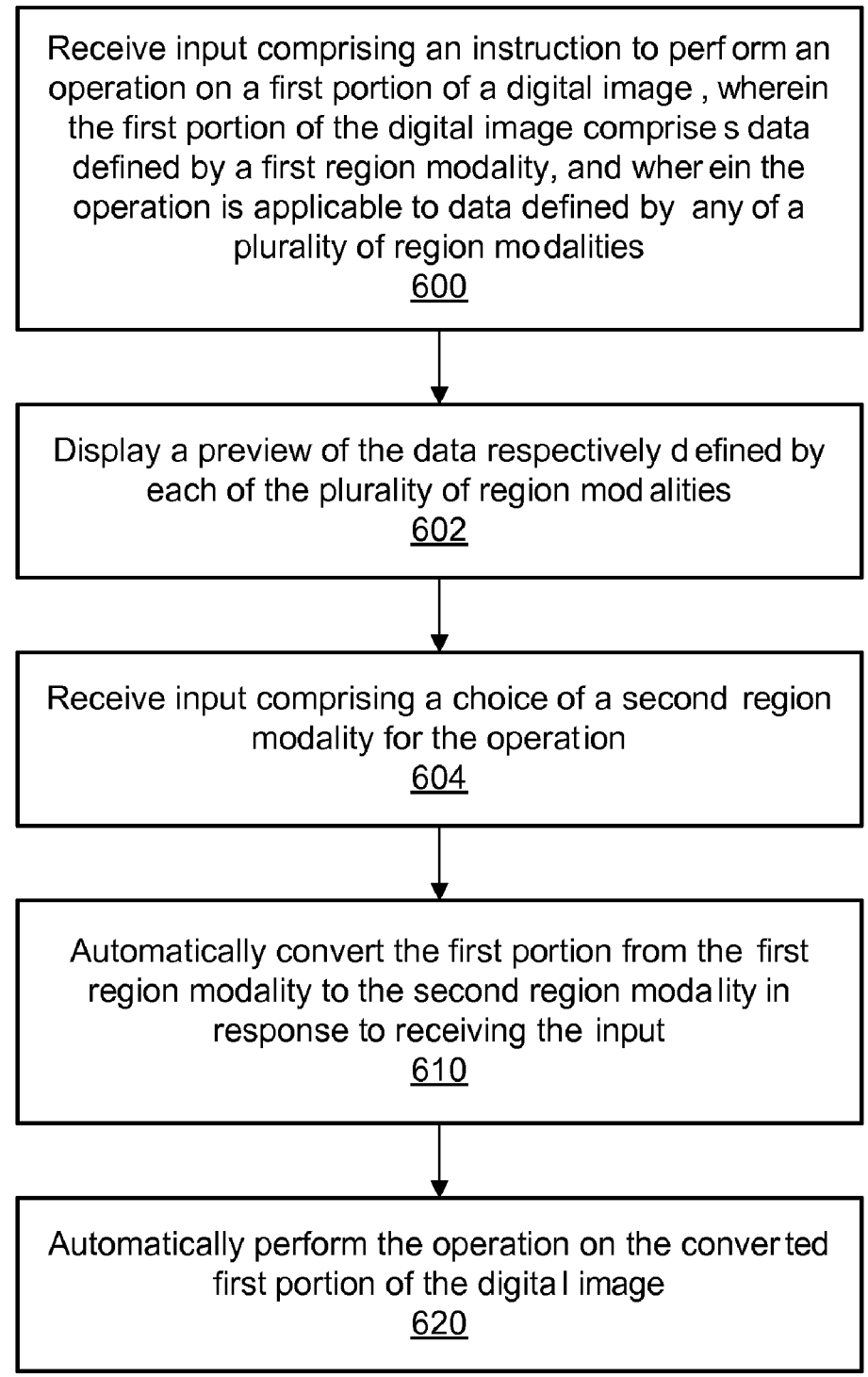
FIG. 6 is a flow diagram illustrating one embodiment of a method for editing a digital image with automatic conversion from a first region modality to a chosen region modality.

According to one embodiment, the operation may be applicable to a region defined by any of a plurality of region modalities (e.g., a combination of a mask, selection, and/or a path). Under these circumstances, the user may be presented with a set of choices of a "target" modality for the operation. FIG. 6 is a flow diagram illustrating one embodiment of a method for editing a digital image with automatic conversion from a first region modality to a chosen region modality. As shown in block 600, input comprising an instruction to perform an operation on a first portion of the digital image may be received. The first portion of the digital image may comprise data defined by a first region modality using the modality generation facilities 130. In various embodiments, the first region modality may comprise a mask 152 generated using mask generation facilities 132, a selection 154 generated using selection generation facilities 134, or a path 156 generated using path generation facilities 136. The operation may be one of the image editing operations 120 provided by the digital image editing program 100. The instruction to perform the operation may be generated by a user of the digital image editing program 100 and may be received as input by the digital image editing program 100.

As shown in block 602, a preview may be displayed for the regions respectively defined by each of the potential target modalities. For example, if the first region modality is a mask 152, then the previews may comprise a conversion of the mask 152 to a selection 154 and/or a path 156. In generating the previews, the modality conversion facilities 140 may be used. In one embodiment, the previews may also include previews of the operation as applied to the potential target modalities. As a further example, the mask-based operation Refine Edge may be previewed by displaying it as applied to a normal selection, as applied to a mask, or as applied to a result of matting the source image with the mask onto a colored background. The preview for the Refine Edge operation may also be enabled to show a potential application to the mask defined by an enclosed path. In one embodiment, one potential target modality may be previewed at a time, and the user may be permitted to switch to a preview of a different potential target modality. In another embodiment, all the potential target modalities may be previewed simultaneously. As shown in block 604, input comprising the user's final choice of the target region modality (e.g., the second region modality) may be received.

As shown in block 610, the first portion of the digital image may be automatically converted from the first region modality to the second region modality in response to receiving the various types of input from the user. In one embodiment, the automatic modality conversion 140 may automate existing conversion facilities in the digital image editing program 100. According to one embodiment, parameters usable in automatically converting the first portion between region modalities may be defined. For example, the parameters may be defined according to predetermined default values and/or user input. The operation(s) described in block 610 may be performed automatically (i.e., without user intervention subsequent to the instruction input, target modality choice, and/or configuration parameters) and programmatically (i.e., by a computer according to a computer program).

As shown in block 620, the operation may be automatically performed on the converted first portion of the digital image (i.e., as defined by the second region modality). The operation(s) described in block 620 may be performed automatically (i.e., without user intervention subsequent to the instruction input) and programmatically (i.e., by a computer according to a computer program). As discussed with reference to FIG. 5, the first portion of the digital image may be automatically converted from the second region modality back to the first region modality after the operation has been performed.

Figure 7:
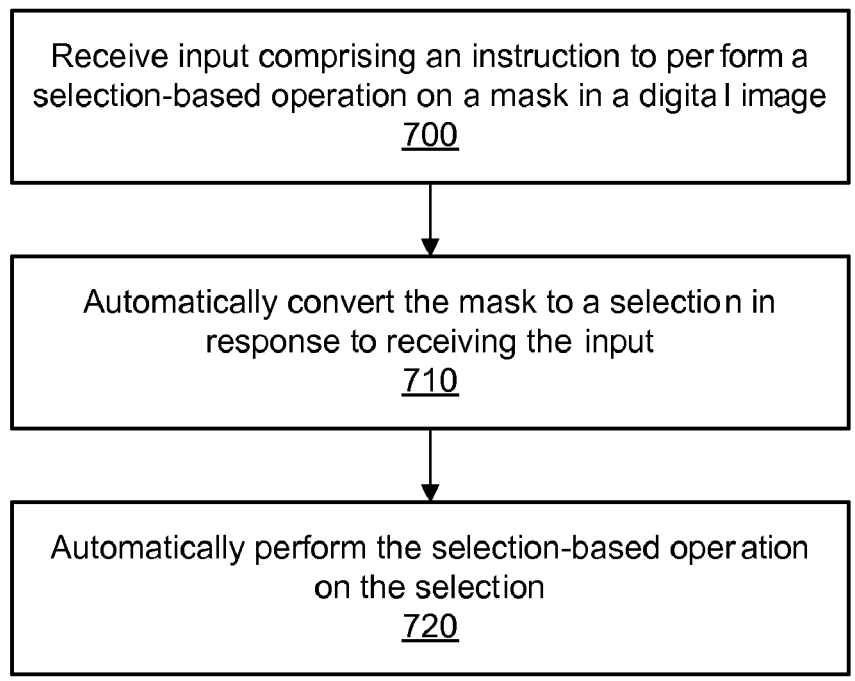
FIG. 7 is a flow diagram illustrating one embodiment of a method for editing a digital image with automatic conversion from a mask to a selection.

FIG. 7 is a flow diagram illustrating one embodiment of a method for editing a digital image with automatic conversion from a mask to a selection. As shown in block 700, input comprising an instruction to perform a selection-based operation on a first portion of the digital image may be received. The first portion of the digital image may comprise a mask 152 generated using the mask generation facilities 132. The selection-based operation may not be directly available to the mask 152 due to their differing region modalities. The instruction to perform the operation may be generated by a user of the digital image editing program 100 and may be received as input by the digital image editing program 100.

As shown in block 710, the mask 152 may be automatically converted to a selection 154 in response to receiving the input. In one embodiment, the automatic modality conversion 140 may automate existing conversion facilities in the digital image editing program 100. The operation(s) described in block 710 may be performed automatically (i.e., without user intervention subsequent to the instruction input and/or configuration parameters) and programmatically (i.e., by a computer according to a computer program).

As shown in block 720, the selection-based operation may be automatically performed on the selection 154. The operation(s) described in block 720 may be performed automatically (i.e., without user intervention subsequent to the instruction input) and programmatically (i.e., by a computer according to a computer program). According to one embodiment, the selection 154 may be automatically converted back to the mask 152 after the operation has been performed.

Figure 8:
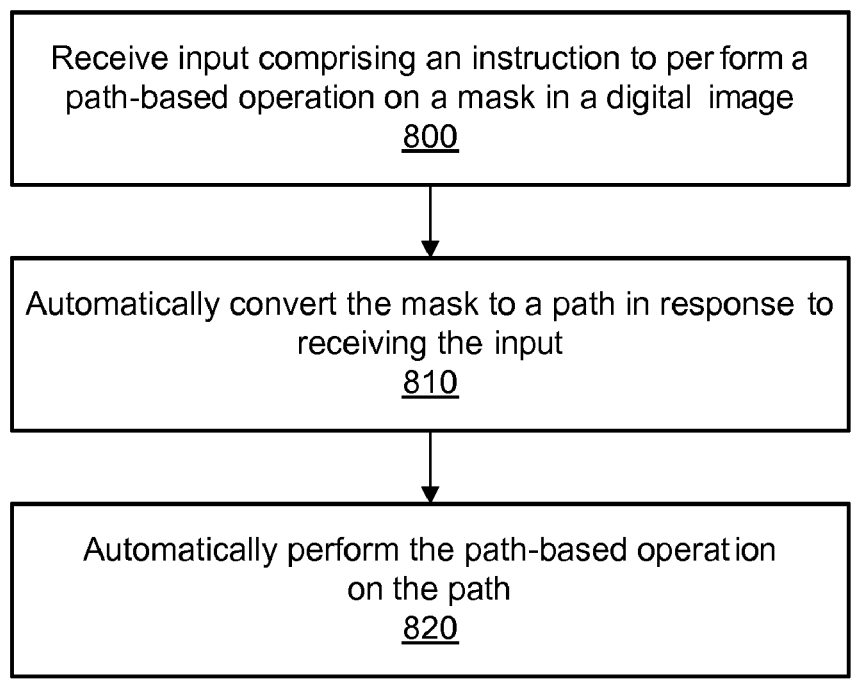
FIG. 8 is a flow diagram illustrating one embodiment of a method for editing a digital image with automatic conversion from a mask to a path.

FIG. 8 is a flow diagram illustrating one embodiment of a method for editing a digital image with automatic conversion from a mask to a path. As shown in block 800, input comprising an instruction to perform a path-based operation on a first portion of the digital image may be received. The first portion of the digital image may comprise a mask 152 generated using the mask generation facilities 132. The path-based operation may not be directly available to the mask 152 due to their differing region modalities. The instruction to perform the operation may be generated by a user of the digital image editing program 100 and may be received as input by the digital image editing program 100.

As shown in block 810, the mask 152 may be automatically converted to a path 156 in response to receiving the input. In one embodiment, the automatic modality conversion 140 may automate existing conversion facilities in the digital image editing program 100. The operation(s) described in block 810 may be performed automatically (i.e., without user intervention subsequent to the instruction input and/or configuration parameters) and programmatically (i.e., by a computer according to a computer program).

As shown in block 820, the path-based operation may be automatically performed on the path 156. The operation(s) described in block 820 may be performed automatically (i.e., without user intervention subsequent to the instruction input) and programmatically (i.e., by a computer according to a computer program). According to one embodiment, the path 156 may be automatically converted back to the mask 152 after the operation has been performed.

In one embodiment, the conversion of the mask 152 to the path 156 may comprise finding the pixels on the edge of the mask (e.g., where black pixels neighbor white pixels) or pixels with a 50% intensity value. Parametric curves may then be fit to these locations. In another embodiment, contours may be determined such as by fitting multiple curves for various intensity values (e.g., 30%, 40%, 50%, 60%, 70%, etc.). The conversion of the mask 152 may therefore generate a plurality of paths. The path-based operations may be applied to each of the paths. In converting the paths back to the mask 152, the path values may be interpolated to determine intermediate raster values, thereby preserving more of the original mask information.

Figure 9:
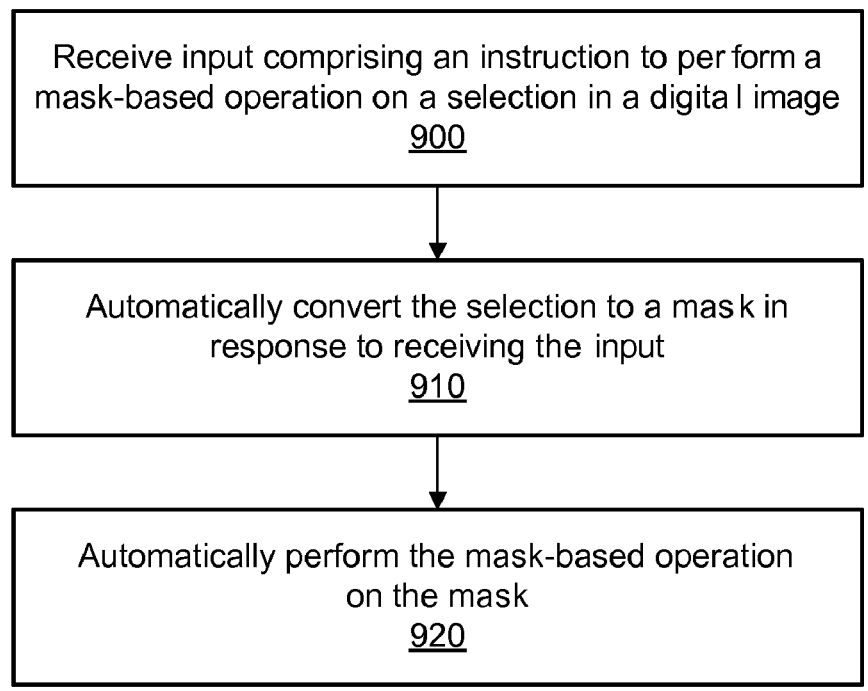
FIG. 9 is a flow diagram illustrating one embodiment of a method for editing a digital image with automatic conversion from a selection to a mask.

FIG. 9 is a flow diagram illustrating one embodiment of a method for editing a digital image with automatic conversion from a selection to a mask. As shown in block 900, input comprising an instruction to perform a mask-based operation on a first portion of the digital image may be received. The first portion of the digital image may comprise a selection 154 generated using the selection generation facilities 134. The mask-based operation may not be directly available to the selection 154 due to their differing region modalities. The instruction to perform the operation may be generated by a user of the digital image editing program 100 and may be received as input by the digital image editing program 100.

As shown in block 910, the selection 154 may be automatically converted to a mask 152 in response to receiving the input. In one embodiment, the automatic modality conversion 140 may automate existing conversion facilities in the digital image editing program 100. The operation(s) described in block 910 may be performed automatically (i.e., without user intervention subsequent to the instruction input and/or configuration parameters) and programmatically (i.e., by a computer according to a computer program).

As shown in block 920, the mask-based operation may be automatically performed on the mask 152. The operation(s)

described in block 920 may be performed automatically (i.e., without user intervention subsequent to the instruction input) and programmatically (i.e., by a computer according to a computer program). According to one embodiment, the mask 152 may be automatically converted back to the selection 154 after the operation has been performed.

Figure 10:
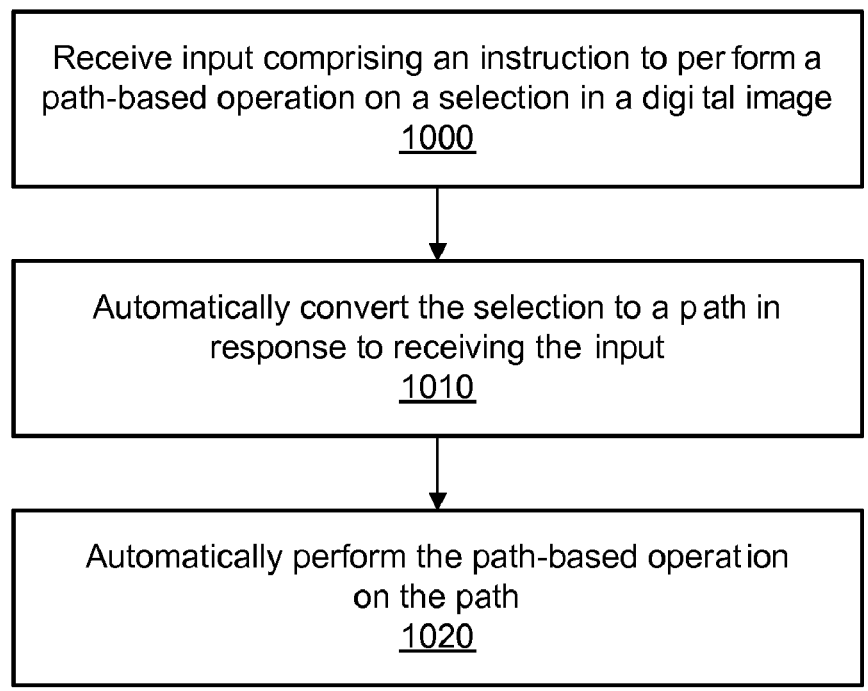
FIG. 10 is a flow diagram illustrating one embodiment of a method for editing a digital image with automatic conversion from a selection to a path.

FIG. 10 is a flow diagram illustrating one embodiment of a method for editing a digital image with automatic conversion from a selection to a path. As shown in block 1000, input comprising an instruction to perform a path-based operation on a first portion of the digital image may be received. The first portion of the digital image may comprise a selection 154 generated using the selection generation facilities 134. The path-based operation may not be directly available to the selection 154 due to their differing region modalities. The instruction to perform the operation may be generated by a user of the digital image editing program 100 and may be received as input by the digital image editing program 100.

As shown in block 1010, the selection 154 may be automatically converted to a path 156 in response to receiving the input. In one embodiment, the automatic modality conversion 140 may automate existing conversion facilities in the digital image editing program 100. The operation(s) described in block 1010 may be performed automatically (i.e., without user intervention subsequent to the instruction input and/or configuration parameters) and programmatically (i.e., by a computer according to a computer program).

As shown in block 1020, the path-based operation may be automatically performed on the path 156. The operation(s) described in block 1020 may be performed automatically (i.e., without user intervention subsequent to the instruction input) and programmatically (i.e., by a computer according to a computer program). According to one embodiment, the path 156 may be automatically converted back to the selection 154 after the operation has been performed.

Figure 11:
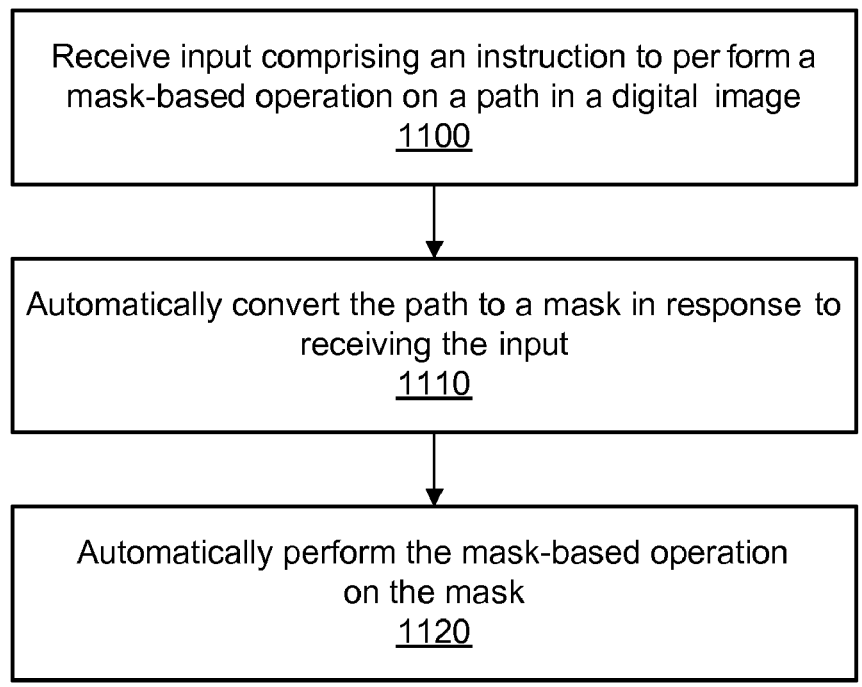
FIG. 11 is a flow diagram illustrating one embodiment of a method for editing a digital image with automatic conversion from a path to a mask.

FIG. 11 is a flow diagram illustrating one embodiment of a method for editing a digital image with automatic conversion from a path to a mask. As shown in block 1100, input comprising an instruction to perform a mask-based operation on a first portion of the digital image may be received. The first portion of the digital image may comprise a path 156 generated using the path generation facilities 136. The mask-based operation may not be directly available to the path 156 due to their differing region modalities. The instruction to perform the operation may be generated by a user of the digital image editing program 100 and may be received as input by the digital image editing program 100.

As shown in block 1110, the path 156 may be automatically converted to a mask 152 in response to receiving the input. In one embodiment, the automatic modality conversion 140 may automate existing conversion facilities in the digital image editing program 100. The operation(s) described in block 1110 may be performed automatically (i.e., without user intervention subsequent to the instruction input and/or configuration parameters) and programmatically (i.e., by a computer according to a computer program).

As shown in block 1120, the mask-based operation may be automatically performed on the mask 152. The operation(s) described in block 1120 may be performed automatically (i.e., without user intervention subsequent to the instruction input) and programmatically (i.e., by a computer according to a computer program). According to one embodiment, the mask 152 may be automatically converted back to the path 156 after the operation has been performed.

Figure 12:
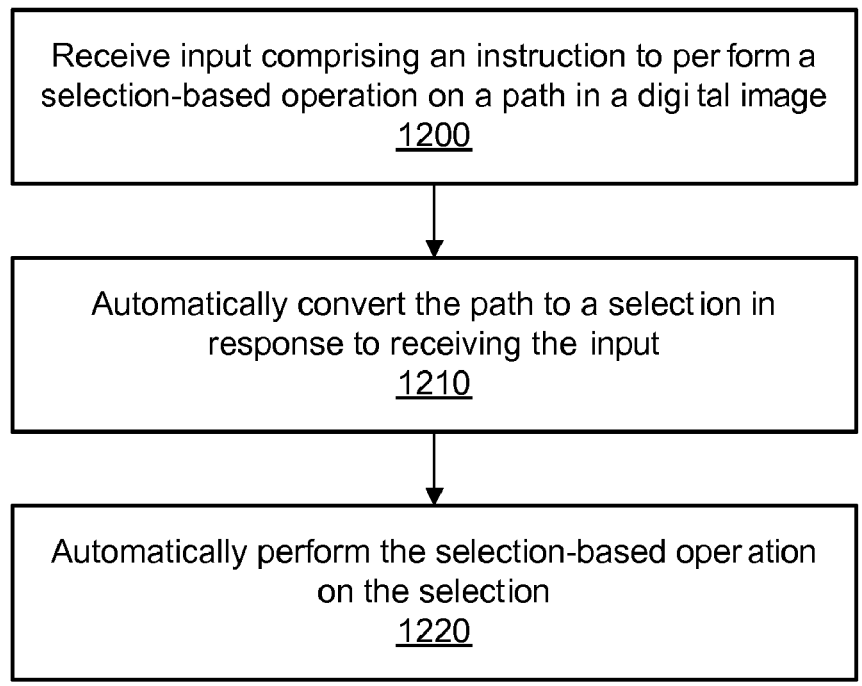
FIG. 12 is a flow diagram illustrating one embodiment of a method for editing a digital image with automatic conversion from a path to a selection.

FIG. 12 is a flow diagram illustrating one embodiment of a method for editing a digital image with automatic conversion from a path to a selection. As shown in block 1200, input comprising an instruction to perform a selection-based operation on a first portion of the digital image may be received. The first portion of the digital image may comprise a path 156 generated using the path generation facilities 136. The selection-based operation may not be directly available to the path 156 due to their differing region modalities. The instruction to perform the operation may be generated by a user of the digital image editing program 100 and may be received as input by the digital image editing program 100.

As shown in block 1210, the path 156 may be automatically converted to a selection 154 in response to receiving the input. In one embodiment, the automatic modality conversion 140 may automate existing conversion facilities in the digital image editing program 100. The operation(s) described in block 1210 may be performed automatically (i.e., without user intervention subsequent to the instruction input and/or configuration parameters) and programmatically (i.e., by a computer according to a computer program).

As shown in block 1220, the selection-based operation may be automatically performed on the selection 154. The operation(s) described in block 1220 may be performed automatically (i.e., without user intervention subsequent to the instruction input) and programmatically (i.e., by a computer according to a computer program). According to one embodiment, the selection 154 may be automatically converted back to the path 156 after the operation has been performed.

FIG. 13 is a block diagram illustrating constituent elements of a computer system 1300 that is configured to implement embodiments of the systems and methods disclosed herein for editing a digital image using automatic conversion between region modalities. The computer system 1300 may include one or more processors 1310 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 1300, such as various versions of Unix, Linux, Windows™ from Microsoft Corporation, Mac OS™ from Apple Corporation, or any other operating system that enables the operation of software on a hardware platform. The processor(s) 1310 may be coupled to one or more of the other illustrated components, such as a memory 1320, by at least one communications bus.

In one embodiment, a graphics card or other graphics component 1356 may be coupled to the processor(s) 1310. The graphics component 1356 may comprise a graphics processing unit (GPU) and local video memory (e.g., VRAM) for efficiently performing specialized graphics tasks. Additionally, the computer system 1300 may include one or more displays 1352. In one embodiment, the display(s) 1352 may be coupled to the graphics card 1356 for display of data provided by the graphics card 1356.

Program instructions that may be executable by the processor(s) 1310 to implement aspects of the techniques described herein may be partly or fully resident within the memory 1320 at the computer system 1300 at any point in time. For example, the program instructions may comprise a digital image editing program 100 including automatic modality conversion 140 as shown in FIGS. 1 through 4. The memory 1320 may be implemented using any appropriate medium such as any of various types of ROM or RAM (e.g., DRAM, SDRAM, RDRAM, SRAM, etc.), or combinations thereof. The program instructions may also be stored on a storage device 1360 accessible from the processor(s) 1310. Any of a variety of storage devices 1360 may be used to store the program instructions in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 1360 may be coupled to the processor(s) 1310 through one or more storage or I/O interfaces. In some embodiments, the program instructions may be provided to the computer system 1300 via any suitable computer-readable storage medium including the memory 1320 and storage devices 1360 described above.

The computer system 1300 may also include one or more additional I/O interfaces, such as interfaces for one or more user input devices 1350. In addition, the computer system 1300 may include one or more network interfaces 1354 providing access to a network. It should be noted that one or more components of the computer system 1300 may be located remotely and accessed via the network. The digital image editing program 100 may be implemented in various embodiments using any desired programming language, scripting language, or combination of programming languages and/or scripting languages, e.g., C, C++, C#, Java™, Perl, etc. It will be apparent to those having ordinary skill in the art that computer system 1300 can also include numerous elements not shown in FIG. 13, as illustrated by the ellipsis shown.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for editing a digital image, comprising:
   receiving input comprising an instruction to perform an operation on a first portion of the digital image, wherein the operation is applicable to data defined by any of a plurality of region modalities including a first region modality and a second region modality, and wherein the first portion of the digital image comprises a first set of target data defined by the first region modality;
   receiving user input comprising a selection of the second region modality for the operation;
   automatically converting the first portion from the first region modality to the second region modality in response to receiving the user input comprising the selection of the second region modality for the operation, wherein the converted first portion of the digital image comprises a second set of target data defined by the second region modality; and
   automatically performing the operation on the converted first portion of the digital image comprising the second set of target data defined by the second region modality.

2. The method as recited in claim 1, further comprising:
   displaying a preview of the data respectively defined by each of the plurality of region modalities prior to receiving the user input comprising the selection of the second region modality for the operation.

3. The method as recited in claim 1, further comprising:
   prompting a user to select one of the plurality of region modalities for the operation prior to receiving the user input comprising the selection of the second region modality for the operation.

4. The method as recited in claim 1, further comprising:
   automatically converting the first portion from the second region modality to the first region modality after automatically performing the operation on the converted first portion of the digital image.

5. The method as recited in claim 1, wherein the plurality of region modalities comprise a mask, a selection, and a path.

6. The method as recited in claim 1, wherein the first region modality comprises a selection, wherein the second region modality comprises a mask, and wherein automatically converting the first portion from the first region modality to the second region modality comprises performing a bit-depth conversion.

7. The method as recited in claim 1, wherein the first region modality comprises a selection, wherein the second region modality comprises a path, and wherein the first portion is automatically converted from the first region modality to the second region modality based on parameters defining a tightness of a curve fit for modeling an edge of the selection.

8. A non-transitory computer-readable storage medium, comprising program instructions, wherein the program instructions are computer-executable to implement:
   receiving input comprising an instruction to perform an operation on a first portion of the digital image, wherein the operation is applicable to data defined by any of a plurality of region modalities including a first region modality and a second region modality, and wherein the first portion of the digital image comprises a first set of target data defined by the first region modality;
   receiving user input comprising a selection of the second region modality for the operation;
   automatically converting the first portion from the first region modality to the second region modality in response to receiving the user input comprising the selection of the second region modality for the operation, wherein the converted first portion of the digital image comprises a second set of target data defined by the second region modality; and
   automatically performing the operation on the converted first portion of the digital image comprising the second set of target data defined by the second region modality.

9. The non-transitory computer-readable storage medium as recited in claim 8, wherein the program instructions are further computer-executable to implement:
   displaying a preview of the data respectively defined by each of the plurality of region modalities prior to receiving the user input comprising the selection of the second region modality for the operation.

10. The non-transitory computer-readable storage medium as recited in claim 8, wherein the program instructions are further computer-executable to implement:
    prompting a user to select one of the plurality of region modalities for the operation prior to receiving the user input comprising the selection of the second region modality for the operation.

11. The non-transitory computer-readable storage medium as recited in claim 8, wherein the program instructions are further computer-executable to implement:
    automatically converting the first portion from the second region modality to the first region modality after automatically performing the operation on the converted first portion of the digital image.

12. The non-transitory computer-readable storage medium as recited in claim 8, wherein the plurality of region modalities comprise a mask, a selection, and a path.

13. The non-transitory computer-readable storage medium as recited in claim 8, wherein the first region modality comprises a selection, wherein the second region modality comprises a mask, and wherein automatically converting the first portion from the first region modality to the second region modality comprises performing a bit-depth conversion.

14. The non-transitory computer-readable storage medium as recited in claim 8, wherein the first region modality comprises a selection, wherein the second region modality comprises a path, and wherein the first portion is automatically converted from the first region modality to the second region modality based on parameters defining a tightness of a curve fit for modeling an edge of the selection.

15. A system, comprising:
at least one processor;
a memory coupled to the at least one processor, wherein the memory is configured to store program instructions executable by the at least one processor to:
receive input comprising an instruction to perform an operation on a first portion of the digital image, wherein the operation is applicable to data defined by any of a plurality of region modalities including a first region modality and a second region modality, and wherein the first portion of the digital image comprises a first set of target data defined by the first region modality;
receive user input comprising a selection of the second region modality for the operation;
automatically convert the first portion from the first region modality to the second region modality in response to receiving the user input comprising the selection of the second region modality for the operation, wherein the converted first portion of the digital image comprises a second set of target data defined by the second region modality; and
automatically perform the operation on the converted first portion of the digital image comprising the second set of target data defined by the second region modality.

16. The system as recited in claim 15, further comprising:
a display device;
wherein the program instructions are further executable by the at least one processor to:
display on the display device a preview of the data respectively defined by each of the plurality of region modalities prior to receiving the user input comprising the selection of the second region modality for the operation.

17. The system as recited in claim 15, wherein the program instructions are further executable by the at least one processor to:
prompt a user to select one of the plurality of region modalities for the operation prior to receiving the user input comprising the selection of the second region modality for the operation.

18. The system as recited in claim 15, wherein the program instructions are further executable by the at least one processor to:
automatically convert the first portion from the second region modality to the first region modality after automatically performing the operation on the converted first portion of the digital image.

19. The system as recited in claim 15, wherein the plurality of region modalities comprise a mask, a selection, and a path.

20. The system as recited in claim 15, wherein the first region modality comprises a selection, wherein the second region modality comprises a mask, and wherein, in automatically converting the first portion from the first region modality to the second region modality, the program instructions are further executable by the at least one processor to perform a bit-depth conversion.

\* \* \* \* \*